UNITED STATES PATENT OFFICE 2,401,769

SYNTHETIC DRYING OILS

Charles J. Mighton, Wilmington, Del., assignor to E. I. du Pont de Nemours & Company, Wilmington, Del., a corporation of Delaware No Drawing. Application March 30, 1942, Serial No. 436,910

11 Claims. (Cl. 260—23)

This invention relates to new and useful compositions of matter and more particularly to synthetic drying oils and to coating compositions containing them.

The drastic shortage of higher grade drying oils, such as China-wood and Perilla oils, has led to the development of synthetic compositions designed to replace the drying oils. Air drying films have been obtained, for example by polymerizing furylethylene at temperatures of 180° C. and above, in the presence of various catalysts including drying oils in amount up to 5%. The products thus obtained are resinous in that they closely resemble polyfurylethylene rather than drying oil.

This invention has as an object new and useful compositions of matter. A further object is the preparation of valuable film-forming compositions. A still further object is the production of new and improved synthetic drying oils. A still further object is an economical method for making these synthetic oils. Other objects will appear hereinafter.

The above objects are accomplished by the copolymerization of a furylethylene with a substantial amount of drying or semi-drying oil in the manner more particularly pointed out hereinafter.

I have discovered that when a mixture of a furylethylene and drying oil, consisting in major amount of the fatty oil, is heated at polymerizing temperature but not above about 175° C., that a copolymer is obtained which possesses the air drying characteristics of the natural oil and which yields films that in several respects are improved over the films obtained from the drying oil itself.

The copolymers forming the synthetic drying oils of this invention contain the oil and furylethylene in proportions of from about 65% oil and 35% furylethylene to about 95% oil and 5% furylethylene. Copolymers containing these proportions of oil and furylethylene can be obtained, however, by using the oil in amount as low as about 50% by weight of the two ingredients. It is desirable, however, to use the ingredients in the above mentioned proportions contained in the copolymer in order to avoid the presence in the product obtained of undesirably large amounts of incompatible material comprising polymerized furylethylene. The mixture of oil and furylethylene is preferably heated at a polymerizing temperature not exceeding 175° C.

In the best method of carrying out the invention the mixture of furylethylene and the fatty oil containing on the basis of these ingredients in the composition from 15% to 25% of the furylethylene, and hence from about 75% to 85% of the oil, is heated in the presence of a polymerization catalyst such as a peroxide compound at a temperature starting at 130° C. and gradually raised to 160° C., and continuing the heating until the polymerization is complete. The copolymerization is preferably carried out in a slightly alkaline medium. Since naturally occurring oils generally have a slight acidity, a small amount of a base such as potassium carbonate is added in order to have the reaction medium slightly alkaline. When temperatures above about 175° C. are used a dark nonhomogeneous mass having inferior drying properties is formed. Temperatures of 100° C. and lower can be used but with the lower temperatures the time becomes undesirably long unless the emulsion polymerization method is used, in which case temperatures as low as 75° C. can be used without unduly prolonging the reaction time. This method, somewhat more troublesome due to difficulties in breaking the emulsion at the end of the reaction, can be carried out by heating at 75° to 90° C. for two to three hours an aqueous sodium oleate emulsion containing furylethylene, the fatty oil and ammonium persulfate catalyst.

A preferred method of carrying out the invention consists in heating a solution of furylethylene (about 20%) in the oil in the presence of 1–2% potassium carbonate and 1–2% benzoyl peroxide, based on furylethylene, in a reactor fitted with a thermometer, gas inlet tube for maintaining an inert atmosphere, agitator, and condenser. The contents of the reactor are kept at 130°–160° C. for 8 to 15 hours. At the beginning of the reaction monomeric furylethylene refluxes gently in the condenser, but as the polymerization proceeds, less and less refluxing is noticed and finally, when all the furylethylene has copolymerized, no refluxing, even at 160° C. can be observed.

The furylethylenes used in the practice of this invention are furylethylene which is 2-vinylfuran

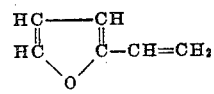

and substituted furylethylenes containing an unsubstituted terminal methylene group. Furylethylene is prepared readily by condensing furfural with acetic acid according to a copending application Serial No. 410,167. The purified furylethylene is a colorless liquid boiling at 51°

C. under 143 mm. pressure or at 101° C. at 760 mm. pressure. The oils best suited for making these new products include any drying (or semi-drying) oil such as linseed oil, China-wood oil, soya oil, corn oil, Perilla oil, oiticica oil and menhaden oil.

Other furylethylene compounds are 2-vinyl-5-methylfurane obtainable from 5-methylfurfural and acetic acid; 2-vinyl-5-chlorofurane obtainable from 5-chlorofurfural and acetic acid; 3-vinyl-furane obtainable from 3-furfural and acetic acid; and 2-isopropenylfurane obtainable by dehydration of dimethylfurylcarbinol.

The invention is further illustrated by the following examples in which the parts are by weight.

*Example I*

A mixture consisting of refined soya oil (560 parts), furylethylene (140 parts or 20% of the total weight of the reactants), benzoyl peroxide (2.7 parts), and potassium carbonate (3.3 parts) is placed in a 3-necked reactor connected with a water-cooled condenser, a motor driven stirrer, a thermometer and a gas inlet tube. After displacing the atmosphere above the reaction mixture with purified nitrogen, the mixture is heated to the reflux point (a bath temperature at 135° C.) for 3.5 hours. During an additional 11.5 hours heating, the bath temperature is gradually raised to 160° C., the refluxing of the furylethylene gradually decreasing in extent, and finally disappearing entirely, thus indicating substantial polymerization. The product is cooled and evacuated at steam-bath temperatures and 20 mm. pressure for 1 hour. All the furylethylene copolymerizes with the soya oil under these conditions since there is no weight loss due to evaporation of monomeric furylethylene during the evacuation treatment. After filtering, an oil of viscosity B and color 2 is obtained according to the Gardner-Holdt standard.

A film of this copolymer, containing sufficient amount of a cobalt naphthenate drier to furnish 0.03% metallic cobalt, air dried on a sanded steel substrate at room temperature in slightly over 15 hours. At the end of this time an unmodified soya oil film was still tacky, and an unmodified linseed oil film had a distinct residual tack. Films of this new air drying composition are roughly comparable to Perilla oil in drying rate, hardness, toughness and durability of the films.

*Example II*

A mixture consisting of alkali refined linseed oil (37.5 parts), furylethylene (25 parts or 40% of the total weight of reactants), 0.5 part of potassium carbonate, and 0.5 part of benzoyl peroxide is copolymerized in the same type of equipment and under the same general procedure as described in Example I. During 11.5 hours the reaction temperature is kept at 130°-160° C., followed by a final heat treatment at 160° C. for an additional 3 hours. The product is cooled and evacuated as described in Example I. In this way 9 parts of monomeric furylethylene is recovered and a copolymer consisting of 29% furylethylene and 71% linseed oil is obtained.

A film of this furylethylene linseed oil copolymer, containing 0.03% metallic cobalt, air-dried tack-free over a sanded steel substrate at room temperature in 8 hours. At the end of this time, an unmodified linseed oil was still tacky. After drying overnight, the unmodified linseed oil film had a distinct residual tack and was weak and soft. The furylethylene linseed oil copolymer was completely tack-free, hard, tough and light in color.

This oil is made into a varnish as follows: The oil (6.3 parts) is bodied at 270°-280° C. for 2¾ hours to a heavy body (greater than Z6). While still hot, 2.9 parts of a limed rosin solution (64% limed rosin in mineral spirits) is added with stirring. Enough manganese resinate and lead naphthenate to furnish 0.04% manganese and 4% lead respectively are added and the varnish is thinned to viscosity E with mineral spirits. A film of this varnish air dries to a hard, tough film over steel in 7 hours. A comparable varnish made from unmodified linseed oil is slower drying and is appreciably softer after air drying for a period of 20 hours. This new varnish is superior in film properties to a corresponding varnish of Perilla oil.

*Example III*

A mixture consisting of a refined soya oil (100 parts), furylethylene (20 parts or 16.6% of the total weight of the reactants), 1.0 part of potassium carbonate and 0.5 part of benzoyl peroxide is reacted in a manner similar to that described in Example I. The reaction temperature is slowly raised from 135°-180° C. during a period of 9 hours. After cooling, filtering, and evacuating at steam-bath temperatures and 10 mm. pressure, the residue weighs 118 parts, indicating that the product is a copolymer consisting of 15.2% furylethylene and 84.8% soya oil.

Films of this oil containing 0.03% of a cobalt naphthenate drier over substrates such as wood or steel are nearly free of tack after 20 hours. The dried films of this new oil are hard, glossy, adherent and have the superior drying properties usually associated with Perilla oil.

The above described oil can be formulated into a varnish in the following manner: The oil (49 parts) is bodied at 250° C. for 13 hours followed by 2 hours at 285° C. To this viscous oil (viscosity is greater than Z6) are added 22.6 parts of a limed rosin solution (64% limed rosin in mineral spirits) and enough manganese resinate and lead naphthenate to furnish 0.04% manganese and 4% lead respectively. The product is diluted to viscosity H with mineral spirits. Films of this varnish are similar in drying rate and hardness to a Perilla varnish of comparable oil length, and are superior to a corresponding linseed varnish.

An oil prepared as described above is formulated into a paint containing the following ingredients:

| | Parts |
|---|---|
| Copolymer | 159.0 |
| Grinder's lead | 64.0 |
| "Ti-Sil" | 104.7 |
| Titanium dioxide | 14.3 |
| 35% leaded zinc oxide | 148.0 |
| Lead naphthenate | 5.0 |
| Manganese resinate | 2.0 |
| Hydrocarbon thinner | 18.4 |

The ingredient mentioned above as Grinder's lead is white lead ground in a high acid value oil, and "Ti-Sil" is a titanium-magnesium silicate pigment containing approximately 30% $TiO_2$ and 70% $MgSiO_3$.

After grinding in a ball mill with 600 parts of stone balls for 3.5 days, the white paint, after freeing from the balls, is brushed on pine sidings. This paint dries as fast and has about the same gloss and color as a comparable paint containing a mixture of raw and bodied linseed oils as the vehicle, being appreciably better than an unmodified soya paint in these respects.

*Example IV*

An emulsion containing alkali refined linseed oil (50 parts), furylethylene (25 parts), a 10% aqueous sodium oleate solution (150 parts), and ammonium persulfate (0.75 part) is heated with agitation in a three-necked reactor holding an agitator, condenser, and thermometer at 75° C. for 2¾ hours. The emulsion is then coagulated with brine and the oily layer is extracted with benzene. The benzene layer is dried over anhydrous magnesium sulfate and then concentrated in vacuo to remove the solvent. The oily residue is a copolymer of furylethylene and the linseed oil. A film of this copolymer containing 0.03% cobalt drier is more rapid drying than an unmodified linseed control. When examined after drying for about two weeks at room temperature, the film of the copolymer is found to be smooth, tack-free, and considerably harder than the control.

*Example V*

A mixture consisting of a mixed glyceride of linseed acids and crotonic acid (prepared by esterifying a linseed oil diglyceride with crotonic acid; hydroxyl no. (corrected for acidity), 7.5; acid no., 4.4; $n_D^{25}$, 1.4810; color, 3.2; viscosity, B), (100 parts), furylethylene (25 parts) and benzoyl peroxide (1 part) is copolymerized in the same type of equipment and under the same general procedure as described in Example I. During 11 hours the reaction temperature is kept at 90°–140° C. Unreacted furylethylene is removed by blowing the mixture vigorously with carbon dioxide at 140° C. for 15 minutes. Based on the total weight of the product after removing unreacted furylethylene, this copolymer consists of 14% polyfurylethylene in oil.

A film of this furylethylene-modified oil copolymer, containing 0.03% cobalt, air-dried dust-free in 3.5 hours and tack-free and hard in about 10 hours. Under analogous conditions, the unmodified oil is still tacky.

The characteristics of the copolymer will vary somewhat with the particular ingredients, but in any instance the nature of the product obtained, as has been previously indicated, is adversely affected by the use of the furylethylene in too great an excess. For example an initial concentration of 20% furylethylene in admixture with linseed oil can be made to yield the copolymer quantitatively. As the initial concentration of the furylethylene increases there is formed in the copolymer increasing amounts of polyfurylethylene which become undesirably large with an initial concentration of furylethylene above 35%. A similar result follows as the temperature is increased beyond the optimum range of 125° to 155° C. up to the maximum temperature in the neighborhood of 175° C. where the product is non-homogeneous and has poor air-drying properties.

The extent of copolymerization can be roughly determined by noting the extent of reflux of monomeric furylethylene at a given temperature. Thus, at the beginning of the copolymerization (using relatively low amounts of furylethylene), furylethylene refluxes in the condenser (note Example I for a description of suitable apparatus) with a bath temperature of 125°–135° C., depending on the amount of the furylethylene present. As copolymerization proceeds, less monomeric furylethylene is present, thereby slowing down the amount of reflux, and finally the refluxing stops altogether, even though the temperature in the reaction vessel is raised to 160° C. At this point, the copolymerization is roughly 80 to 100% complete. The actual amount of product formed is best determined by evacuating the reaction mixture and noting the loss in weight, if any, due to evaporation of monomeric, unreacted furylethylene.

In emulsion polymerization, which is conducted at lower temperatures, the copolymers are prepared by emulsifying the oil and furylethylene in an aqueous soap solution, addition of a water-soluble peroxygen compound such as ammonium persulfate and heating the mixture at 50°–100° C. for 2–24 hours. The emulsions can be broken by addition of a salt solution and the oily copolymer separated and dried.

The time of reaction is proportional to the temperature. At a temperature of 120° to 160° C. copolymerization is complete in 8 to 15 hours, and at 100° C. or less the reaction requires from 2 to 4 days or more to be essentially complete.

The copolymerization reaction described herein is catalyzed by the usual polymerization catalysts, including benzoyl peroxide, lauroyl peroxide, ascaridol, old samples of paraldehyde, hydrogen peroxide, lead peroxide, and ammonium persulfate.

The reaction can be carried out in acid, neutral or alkaline media. Agents for modifying the hydrogen ion concentration of the reaction medium include acetic acid, propionic acid, drying or semi-drying oil acids, potassium carbonate, sodium carbonate, sodium salts of drying oil acids, sodium bicarbonate or litharge. Small amounts of potassium carbonate (up to 1%) are particularly effective as modifying agents for inducing copolymerization.

Solvents are unnecessary for the copolymerization of furylethylene with oils, but may be used if desired. Suitable solvents include butyl acetate, cellosolve acetate, benzene, chlorobenzene, xylene, kerosene, or nitrobenzene.

The commercial oils of the drying and semi-drying type are suitable for use in the present process. The raw oils are preferably purified to some extent. Included with the fatty oils useful in the practice of this invention are the various mixed glycerides of drying or semi-drying oil acids and synthetic acids such as crotonic acid, methacrylic acid, sorbic acid, beta-2(furylacrylic) acid, cinnamic acid, or cinnamalecetic acid  The oil may be heat-bodied to any extent short of the gellatin point prior to copolymerization with furylethylene.

The copolymers formed as described above are substantially free from monomeric furylethylene but may contain substantial amounts of monomeric or slightly polymerized drying or semi-drying oils. Although the heating of polymerized furylethylene with a drying or semi-drying oil does not yield on heat treatment products useful for the present purpose, valuable film-forming compositions are obtained by preparing a copolymer of furylethylene and the fatty oil having a higher content of furylethylene than is desired, and then blending the copolymer either with an unmodified oil or with a copolymer of such lower furylethylene content that will yield a composition having a furylethylene and oil content within the range given in connection with the copolymers previously described. This blending can be carried out simply by mixing the ingredients in the required proportions.

The products of this invention serve as replacements of the natural drying oils and present several valuable improvements over the natural oils in coating compositions.

As many apparently widely different embodiments of this invention may be made without departing from the spirit and scope thereof, it is to be understood that I do not limit myself to the specific embodiments thereof except as defined in the appended claims.

I claim:

1. A synthetic drying oil comprising a homogeneous composition which is composed of a copolymer of a furylethylene and a fatty oil of the group consisting of drying and semi-drying oils, said oil and furylethylene being present in said copolymer in amount by weight of from about 65% of the fatty oil and 35% of furylethylene to 95% of the fatty oil and 5% of furylethylene.

2. The copolymer set forth in claim 1 in which said oil is a drying oil.

3. A process for preparing a copolymer of furylethylene and a fatty oil of the group consisting of drying and semi-drying oils, said process comprising heating in the presence of a polymerization catalyst at polymerizing temperature not exceeding 175° C. a mixture of the furylethylene and the fatty oil, and continuing the heating until polymerization is substantially complete, said mixture consisting of from 65% of the fatty oil and 35% of furylethylene to 95% of the fatty oil and 5% of furylethylene.

4. A process for preparing a copolymer of furylethylene and a fatty oil of the group consisting of drying and semi-drying oils, said process comprising heating in the presence of a polymerization catalyst at a temperature of 130° C. with gradual increase to 160° C. a mixture of the furylethylene and the fatty oil, and continuing the heating at said last named temperature until polymerization is substantially complete, said mixture consisting of from 65% of the fatty oil and 35% of furylethylene to 95% of the fatty oil and 5% of furylethylene.

5. The process set forth in claim 3 in which said catalyst is a peroxygen compound.

6. The process set forth in claim 4 in which said catalyst is a peroxygen compound.

7. The process set forth in claim 3 in which said catalyst is benzoyl peroxide.

8. The process set forth in claim 4 in which said catalyst is benzoyl peroxide.

9. A synthetic drying oil comprising a homogeneous composition which is composed of a copolymer of a furylethylene and a drying oil, said oil and furylethylene being present in said copolymer in amount by weight of from about 75% of the fatty oil and 25% of furylethylene to 85% of the fatty oil and 15% of furylethylene.

10. The synthetic drying oil set forth in claim 1 in which which said fatty oil is linseed oil.

11. The synthetic drying oil set forth in claim 1 in which said fatty oil is soya bean oil.

CHARLES J. MIGHTON.